June 25, 1957  S. D. POOL ET AL  2,797,103
MACHINE CLAMP FOR IMPLEMENT CARRIER
Filed Nov. 14, 1955  2 Sheets-Sheet 1
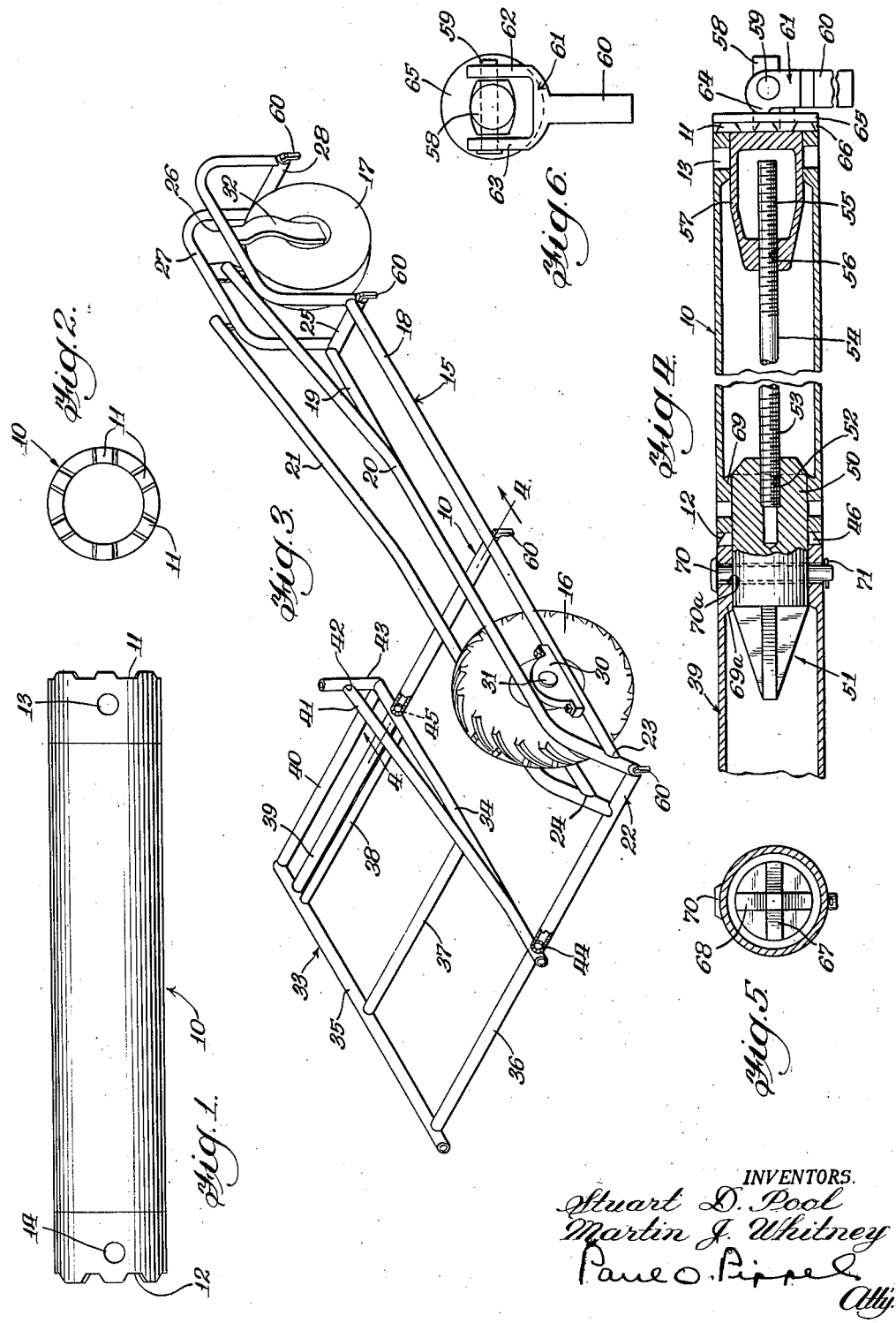
INVENTORS.
Stuart D. Pool
Martin J. Whitney

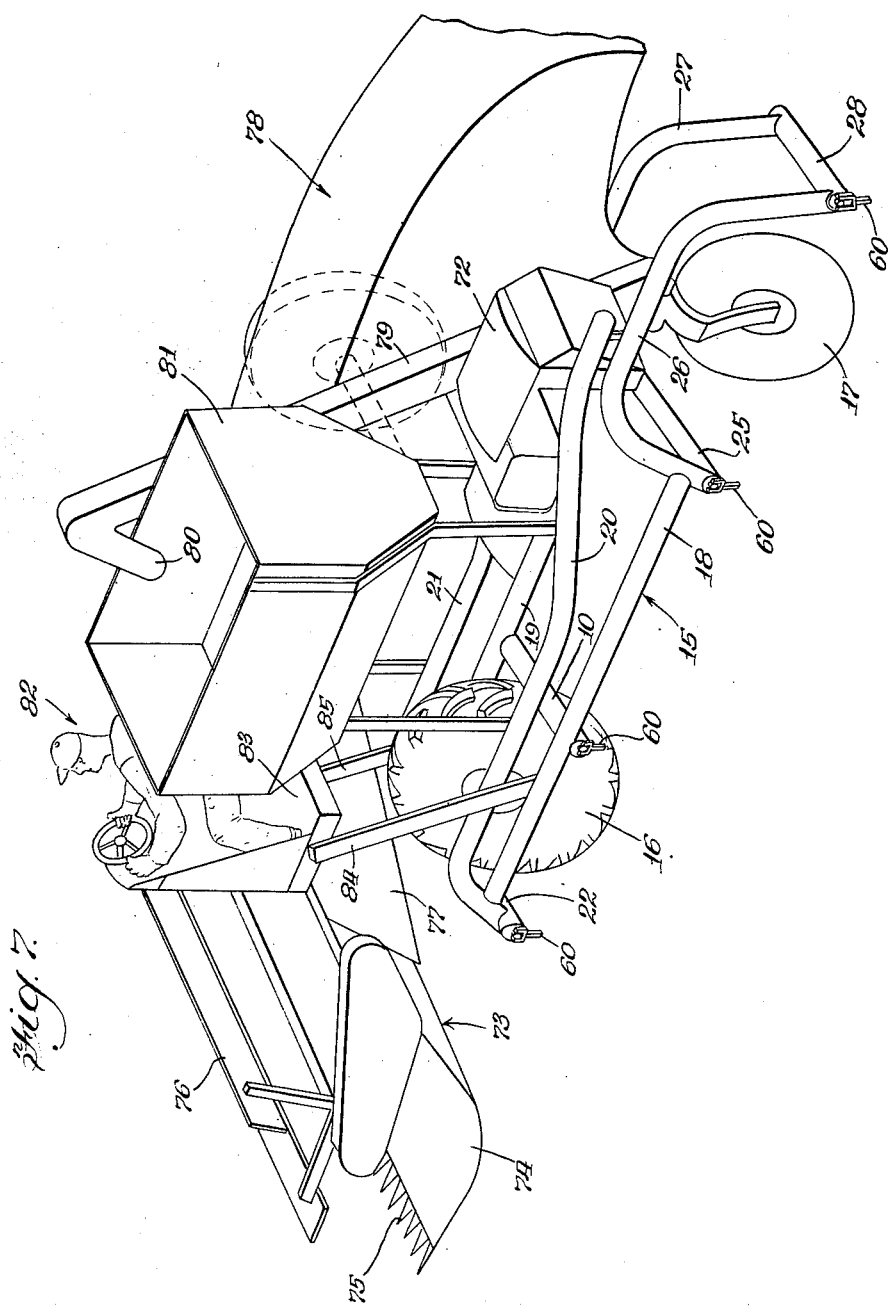

United States Patent Office 2,797,103
Patented June 25, 1957

---

2,797,103

MACHINE CLAMP FOR IMPLEMENT CARRIER

Stuart D. Pool and Martin J. Whitney, Moline, Ill., assignors to International Harvester Company, a corporation of New Jersey Application November 14, 1955, Serial No. 546,406

8 Claims. (Cl. 280—106)

This invention relates to a new and improved machine clamp for implement carrier.

An implement carrier as used in this invention is a form of an agricultural tractor on which various farm implements may be mounted and operated in performing farming tasks. Generally a tractor is construed to be a vehicle which pulls other implements or devices but there are many occasions when implements are mounted directly on the tractor. More particularly an implement carrier distinguishes from an ordinary agricultural tractor in that its primary function is to receive an implement thereon in a most efficient manner. In other words, the implement carrier has been designed expressly to receive mounted implements whereas an agricultural tractor is not so designed. The present application is not concerned with the construction of an entire implement carrier but only the cooperative clamping means for holding the implement to the carrier.

A principal object of this invention is to provide a machine clamp for the purpose of fastening implements to implement carriers.

An important object of this invention is to supply a machine clamp for implement carriers with means for remotely actuating guiding and clamping elements of the machine clamp.

Another and further important object of this invention is the provision of means in a machine clamp for extending or contracting the elements thereof whereby the clamp elements may be held in spaced apart positions and both elements operable for movement toward or away from each other from one end of the mechanism.

Another and still further important object of this invention is to equip a longitudinally extending machine clamp with means for effecting longitudinal separation of spaced elements and superimposed cam means to draw the units being joined tightly together.

Another and further important object of this invention is to provide cone-shaped wedge members with a threaded rod therebetween and a hand-turning member arranged and constructed to cause relative threaded movement and a separation or drawing together of the cone-shaped wedge elements upon rotation thereof.

A still further important object of this invention is to equip an implement with a tubular frame member having a circumferential end edge with spaced notches therein and an implement carrier having a tubular element thereon and also having a circumferential end edge with spaced notches arranged alternately of the notches in the tubular frame member of the implement, and a machine clamp for drawing together or separating the alternately notched adjoining circumferential end edges of the tubular frame member and the tubular element whereby the implement may be rigidly mounted with respect to the implement carrier or separated from the implement carrier.

Another and still further important object of this invention is to provide a clamp means for attaching an implement to an implement carrier and including removable locking pins arranged and constructed to concurrently engage portions of the implement frame and the clamp means of this invention.

Other and further important objects and advantages will become apparent from the disclosures in the following specification and accompanying drawings.

In the drawings:

Figure 1 is a side elevational view of a tubular member used with the machine clamp of this invetnion.

Figure 2 is an end view of the device of Figure 1.

Figure 3 is a perspective view of an implement carrier of this invention shown about to receive the frame attachment of an implement.

Figure 4 is a sectional view taken transversely through one of the adjoining frame members of the implement and implement carrier and showing the machine clamp of this invention applied thereto.

Figure 5 is an end view of the device as shown in Figure 4.

Figure 6 is an end view of the other end of the device as shown in Figure 4 and showing the clamp handle.

Figure 7 is a perspective view of an implement mounted on the implement carrier of this invention and wherein the implement is a harvester-thresher.

As shown in the drawings: The reference numeral 10 indicates generally a tubular member which normally forms a fixed part of an implement carrier or the like. The tubular member 10 has substantial length thereto and constitutes the housing for the clamp mechanism of this invention which is used for the purpose of holding an implement to an implement carrier. The tubular member 10 has one end thereof scalloped or notched in the manner of clutch teeth or the like as shown at 11. Figure 2 also shows the annular scallops 11 in the end of the tube 10. The other end of the tube 10 is similarly scalloped or notched as at 12. A transverse opening 13 is provided adjacent the scalloped end 11 and a similar transverse opening 14 is provided adjacent the scalloped end 12 of the tube 10.

As best shown in Figure 3, an implement carrier is disclosed at least in its basic outline containing frame structure and wheels. The frame is designated by the numeral 15 and includes a front traction wheel 16 and an in-line dirigible wheel 17 located at the opposite end of the frame structure 15. The frame structure is equipped with parallel disposed and longitudinally extending tubular members 18 and 19. A second pair of generally parallel tubular members 20 and 21 are disposed above the tubular members 18 and 19, respectively. The forward end of the frame structure 15 is provided with a cross tubular member 22 which corresponds to the tubular member 10 shown in Figures 1 and 2. Closely adjacent this transversely disposed member 22 are junctions between the members 18 and 19 with the respective top frame members 20 and 21 at 23 and 24. In other words, the top member 20 projects downwardly and forwardly where it joins with the tubular member 18 and similarly the tubular member 21 is bent forwardly and downwardly and provides for the juncture with the tubular member 19 at 24. The lower tubular members 18 and 19 are joined by a transverse member also tubular in shape shown at 25. The rear steerable wheel 17 is disposed within spaced apart bail-like tubular members 26 and 27 which are joined at their forward ends to the cross member 25 and also to the rearward ends of the tubular members 18 and 19. The rearmost ends of the bail members 26 and 27 are joined by a cross member 28. There is thus provided a substantial enclosure for the steerable wheel 17 at the nominal rearward end of the implement carrier as shown herein. It should be understood that the implement carrier might run in either direction and thus the statement that the steerable wheel is at the rearward end of the carrier only applies for implements which may be attached to the carrier and run in the opposite direction or in the direction in which the traction wheel 16 is at the forward end. A bearing 30 somewhat in the nature of a pillow block bearing is mounted on the frame structure and more particularly on the tubular members 18 and 19 at their forward ends to receive an axle shaft 31 for the traction wheel 16. A frame or fork member 32 is adapted to be mounted on the inverted bail-shaped members 26 and 27 at the rear of the carrier and is used for supporting the wheel 17 in steerable condition.

The frame structure for an implement which may be attached to the carrier frame structure 15 is shown at 33. Generally the frame structure 33 for the implement is of tubular construction and includes laterally spaced apart longitudinally extending tubular members 34 and 35. Cross or adjoining tubular members 36, 37, 38, 39 and 40 are provided between the side members 34 and 35 and provide adequate support for any implement carried on this frame structure 33. A tubular brace member 41 is welded or otherwise attached as at 42 to an upright member 43 forming a continuation of the side frame member 44. The cross tubular frame members 36 and 39 are provided with extensions inwardly of the side frame member 34 with annular notched or scalloped surfaces which are complementary to the notched or scalloped ends 11 and/or 12 of the tubular member 10 as shown in Figure 1 and likewise the member 22 disposed at the forward end of the carrier and being identical to the tubular member 10. These annular notched ends 44 and 45 of the implement frame structure combine with the tubular members 36 and 39 to form a support for the implement to the implement carrier.

The tubular members 10 and 22 constitute the housings for the clamp element of this invention. As best shown in Figure 4, there is a longitudinal sectional view taken through the tubular member 10 with the clamp device mounted therein. A cylindrically-shaped core member 50 is adapted to snugly engage the inner circumference of the tubular member 10 and the adjoining member 39 which forms a part of the implement frame. The forward end of the core 50 is shown at 51 and tapers downwardly for easy guiding access to the end of the tubular member 39. A threaded aperture 52 is in axial alignment with the length of the core 50 and receives a threaded rod or screw 53. The center portion of the rod is shown at 54 and is unthreaded. The other end of the same rod is provided with oppositely pitched screw threads 55 for engagement with a threaded aperture 56 in a yoke-type member 57. This member 57 is also a core for slidable movement into and out of said tubular members. The forward end of the core or yoke 57 is conical in shape for easy entrance into the tubular member in the same manner as the core 50 with its tapered end 51. The combination screw having threaded parts 53 and 55 and its intermediate non-threaded portion 54 constitutes a turnbuckle with respect to the core member 50 and the core or yoke member 57. Thus when the screw is turned or the members 50 or 57 are turned, these same members move closer together or further apart within the tubular elements 10 and 39. It is by this mechanism that the clamp between the implement carrier and implement is effected.

The yoke member 57 has an axial extension 58 which projects outwardly beyond the end of the tubular member 10. A transverse pin 59 is provided within the extension 58 and carries an arm member 60 for rotation therearound. A bail portion 61 of the hinged arm 60 has side arms 62 and 63 which are hingedly mounted on the pin 59. Cam surfaces 64 are provided on both of the side arms 62 and 63 as shown in Figure 4, whereupon there may be maintained a greater or lesser distance between the cross shaft 59 and the front of a cap member 65 arranged and constructed to fit over the scalloped end 11 of the tube 10. The cap 65 is similarly equipped with complementary scallops 66 to thereby provide for an interlock fastening between the cap 65 and the sleeve or tubular member 10. When the lever cam arm 60 is in the position as shown in Figure 4, the clamp core member 57 is drawn axially toward the arm 60 and thus toward the end of the tube 10 to thereupon cause a rigid fastening of the clamp elements within the tubular housings.

The outer end of the core 50, as shown at 51, and more specifically shown in Figure 5, has radial cross walls 67 and 68. These cross walls 67 and 68 taper downwardly to a point, as shown in Figure 4, and yet provide complete guiding surface for the clamp member through the opening into the shaft sleeve 39. The tubular housing 10 has a section of smaller diameter within the tube to provide for the snug engagement of the core 50—51 therewith. This reduced diameter portion is shown at 69 and is in alignment with a similar reduced diameter portion in the implement frame tube 39, as shown at 69a. A pin 70 is vertically disposed as shown in Figure 4 and passes downwardly through an aperture 70a in the tubular member 39 comparable to the apertures 13 and 14 in the frame member 10. A cotter pin, or the like, 71 is transversely positioned through the bottom of the pin 70 and maintains the pin in fixed position on the tubular frame members.

In operation the implement carrier is moved to a position closely adjacent the implement which it is desired to have attached thereto. When the vehicles are so aligned that the scalloped end 45 of the implement frame member 39 and the scalloped end 12 of the implement carrier tubular frame member 10 are substantially aligned, the clamp elements are pushed through the other end 11 of the tube 10 until such time as it is convenient to drop the pin 70 into place through the aperture 70a in the frame member 39. Following the positioning of the pin 70 into place the cam handle 60, swung into an upward position, may be readily rotated causing a simultaneous rotation of the yoke-like member 57 whereupon the member 57 moves relative to the screw member 53—54—55. This, of course, causes a spreading of the distance between the members 50 and 57 or a drawing together of these same members. In tightening the clamp, the members 50 and 57 are separated on their turnbuckle type of screw, thereupon rigidly pulling the tubular member 39 into abutting relationship with and in axial alignment with the tubular frame member 10. When this operation is completed, the cam arm 60 is then swung downwardly about its hinge 59 causing the enlarged cam surface 64 to move into the space between the hinge pin 59 and the cap 65 to thereupon give an added tightening to the clamp elements. In the device as shown in Figure 3 only two clamps are employed, one in the tubular element 10 and the other in the tubular element 22, which cooperate respectively with the tubular element 39 and the tubular element 36 on the implement frame. It is, of course, obvious that additional clamping members may be employed within the tubular frame members 25 and 28 at the steerable wheel end of the implement carrier if that occasion arises. For purposes of convenience it will be construed that the clamps employed in the device are identical throughout and the handles 60 are shown hanging downwardly from the tubular members 22, 10, 25 and 28.

The device of Figure 7 is merely to show the implement carrier with an implement mounted thereon rather than as in the showing of Figure 3 wherein there is only disclosed a skeleton of the entire machine. The device of Figure 7 is the same as Figure 3 but for the superstructure of both the implement carrier and the implement mounted thereon. The implement carrier frame 15 has mounted thereon an engine 72 to effect drive of the traction wheel 16 by means (not shown). The implement, in this instance, is a harvester-thresher which has the harvesting portion 73 mounted at the forward end of the device. The harvesting unit includes a platform 74 with a reciprocating cutter bar 75 across the front end thereof, and a reel 76 adapted to be rotated forwardly and downwardly to thereupon cause the standing grain to be held at its top while the lower end thereof adjacent the roots are severed by the cutter bar. A feeder housing 77 extends from the harvesting portion 73 upwardly and rearwardly to the combination threshing and separating housing 78. The grain is separated from the straw and trash in the housing 78, whereupon the clean grain is delivered by means of an elevator 79 upwardly to a discharge spout 80 directly over a grain tank 81. From this point the cleaned and stored grain may be delivered to a wagon or other storing chamber where it is desired. The driver of the implement is shown at 82 on an operator's platform 83 which, in turn, is mounted on arms 84 and 85. Preferably the arms 84 and 85 are hingedly mounted on the spaced-apart frame members 18 and 19 somewhere adjacent the large traction wheel 16. Means (not shown) is provided intermediate the arms 84 and 85 and the frame structure 15 whereupon the operator 82 may be disposed at any level with respect to the frame structure 15 to thereupon effectively operate various implements with this implement carrier.

Numerous details of construction may be varied throughout a wide range without departing from the principles disclosed herein and we therefore do not propose limiting the patent granted hereon otherwise than as necessitated by the appendent claims.

What is claimed is:

1. A clamp device for attaching implements to implement carriers comprising a tubular member fixedly mounted on said implement carrier, a tubular member fixedly mounted on said implement and arranged to form an axial continuation of the tubular member on said implement carrier, said tubular members having scalloped annular edges at their ends, a core member slidable through a remote opening in said tubular member on said implement carrier and positionable between the junction of implement carrier and implement within said aligned tubular members, a yoke-like member positioned within said remote opening of said tubular member on the implement carrier, a turnbuckle screw threadedly engaging said core at one end and at its other end threadedly engaging said yoke-like member, means rotating said yoke-like member to vary the spacing between the core member and the yoke-like member, and pin means passing through the tubular member of the implement and through the included core member.

2. A clamp device for attaching implements to implement carriers comprising a tubular member fixedly mounted on said implement carrier, a tubular member fixedly mounted on said implement and arranged to form an axial continuation of the tubular member on said implement carrier, said tubular members having scalloped annular edges at their ends, a core member slidable through a remote opening in said tubular member on said implement carrier and positionable between the junction of implement carrier and implement within said aligned tubular members, a yoke-like member positioned within said remote opening of said tubular member on the implement carrier, a turnbuckle screw threadedly engaging said core at one end and at its other end threadedly engaging said yoke-like member, means rotating said yoke-like member to vary the spacing between the core member and the yoke-like member, and said core means including a cross shaped tapering outer end for easy guiding within said tubular members.

3. A device as set forth in claim 2 in which the yoke-like member has a conical shaped forward end for easy guiding within said tubular members.

4. A device as set forth in claim 1 in which said means for rotating said yoke-like member includes an integral outward extension of said member projecting beyond the end of said tubular member on said implement carrier, a cap for said outer scalloped end of said tubular member of the implement carrier, said integral outward extension passing through said cap, and means for rotating said integral outward extension.

5. A device as set forth in claim 4 in which there is included means for effecting endwise movement of said integral outward extension.

6. A device as set forth in claim 5 in which said cap includes complementary scallops for engagement with the scallops on said tubular member end.

7. A device as set forth in claim 4 in which the means for rotating said extension includes a handle fastened to said extension.

8. A device as set forth in claim 6 in which the means for rotating said extension includes a handle hinged to said integral extension, and said means for effecting endwise movement comprising a cam means on said hinged handle whereby said handle may be rotated or swung about its hinge.

References Cited in the file of this patent
UNITED STATES PATENTS
1,285,869    Wineman _____ Nov. 26, 1918